Nov. 28, 1961     J. R. MOWERY, JR     3,011,112
ELECTRIC MOTOR BRAKING SYSTEM
Filed Sept. 22, 1954
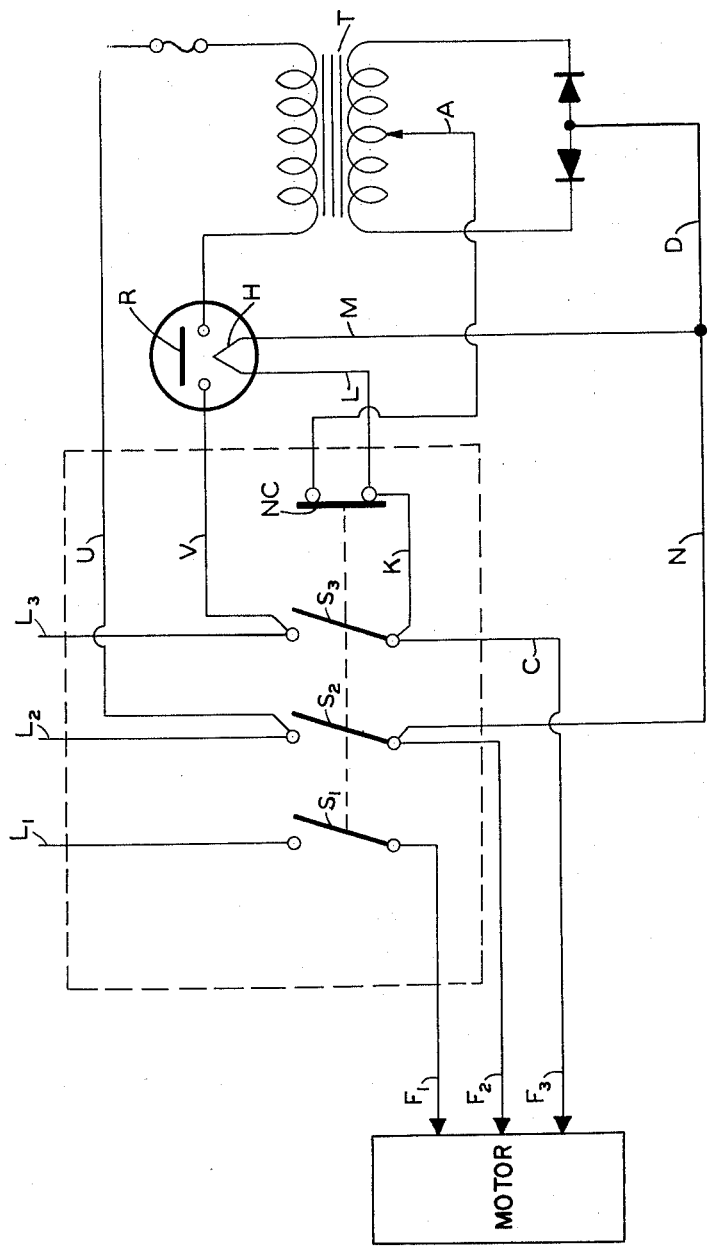
INVENTOR
JESSE R. MOWERY JR
BY *Bradley Cohn*
ATTORNEY

United States Patent Office 3,011,112
Patented Nov. 28, 1961

3,011,112
ELECTRIC MOTOR BRAKING SYSTEM
Jesse R. Mowery, Jr., Lancaster, Pa., assignor to De Walt, Inc., a corporation of Delaware
Filed Sept. 22, 1954, Ser. No. 457,665
1 Claim. (Cl. 318—212)

This invention relates to safety devices for wood and metal working equipment. Particularly, it relates to braking an electric motor.

It is an object of my invention to automatically impress an electric current across an electric motor to stall the motor.

A further object of my invention is to devise a simple means for braking the motion of an A.C. motor having a cutting tool secured to its arbor. Many types of rotary sawing machines, particularly in the woodworking field, present a safety hazard after the current is turned off. The operator, being off guard, may forget the free roll of the dangerous cutting tool. This is particularly true on machines of the radial arm type in which a motor and tool are mounted on a horizontally reciprocable carriage. Movement of the carriage after the tool motor is turned off may entrap the unsuspecting or unwary operator in the tool while it is still in motion due to momentum. If the arm should, for one reason or another, be ever so slightly tilted from level, the carriage, motor and cutting tool may "walk" along the arm. This increases the hazard since an operator who has pushed the carriage away from him, may not suspect it will drift or walk back with the motor and cutting instrument still coasting.

It is therefore an object of my invention to devise a simple electrical arrangement that will insure the motor's stopping immediately its power is cut off.

The drawing shows a schematic diagram of an embodiment of the invention applied to an A.C. motor.

Referring to the drawings, I show a diagram in which L1, L2 and L3 are the power lines leading to a three phase A.C. motor (not shown). The motor is started by closing the gang switch S1, S2, S3 which opens the switch NC connected in gang with S1, S2, S3. Closing of the gang switch S1, S2, S3 energizes the lines F1, F2, F3 leading to the field coils of the A.C. motor. It likewise energizes, through lines K, L, M and N connecting S2 to S3, the activating element H of the normally open time delay relay R which may be of the thermal type as is shown. This activation of element H closes the armature of relay R to energize the transformer T through lines U and V. For purpose of illustration, transformer T is shown as a step down type. The output voltage of transformer T is rectified to D.C. by a suitable rectifier SR, and applied to one of the field coils of the motor through F2, F3 by means of connecting lines N, D and A, K, C, respectively. The circuit, however, is normally open between lines A, K at switch NC. When, however, gang switch S1, S2, S3 is opened, removing A.C. power from the motor, the switch NC is closed thereby impressing the rectified output voltage (D.C.) of transformer T across the field coil lines F2, F3 to dynamically brake the A.C. motor. At the same time the opening of the gang switches S2 and S3 also de-energizes the heater H of the thermal time relay so that after a suitable time interval it will de-energize transformer T.

In practice with a particular motor in a woodworking machine in which I have employed my invention, I have found that the motor may be stopped in 6 to 8 seconds. In order to provide a safety factor I have employed a time relay that opens in 20 seconds.

It is, of course, obvious to one skilled in the art that one may use a different type of time relay other than a thermal one. Also one skilled in the art may provide other means for supplying a rectified current than transformer T and rectifier SR.

I claim:

An electric motor braking system comprising a source of alternating current, an electric motor responsive to alternating current, a normally-open single-throw switch having at least respective first and second input terminals and respective first and second output terminals, leads connecting said input terminals to said source of alternating current, leads connecting said output terminals to said motor, whereby said motor may be energized by closing said switch, a step-down transformer having a high-voltage primary winding connected to said source of alternating current, said transformer further having a low-voltage secondary winding including a center tap, a rectifier connected across said secondary winding of said transformer, said rectifier comprising a pair of opposed diodes having a junction therebetween, a normally-closed switch mechanically ganged to said normally-open switch and having respective first and second contacts, a lead connecting said first contact to said second output terminal of said normally-open switch, a lead connecting said junction of said diodes to said first output terminal of said normally-open switch, a lead connecting said center tap of said secondary winding of said transformer to said second contact of said normally-closed switch, whereby a low voltage direct current braking force may be supplied to said motor upon the de-energization of said motor, a time-delay thermal relay having a heater element, a lead connecting one side of said heater element to said first contact of said normally-closed switch, a lead connecting the other side of said heater element to said first output terminal of said normally-open switch, said relay further having a thermally-responsive normally-open pair of contacts connected in series between said source of alternating current and said primary winding of said transformer, whereby said contacts are closed during the energization of said motor, and whereby said contacts are opened a predetermined time interval after the opening of said normally-open switch, thereby to disconnect the braking force to said motor.

References Cited in the file of this patent

UNITED STATES PATENTS

| 1,911,356 | Eames | May 30, 1933 |
| 1,945,392 | Borden | Jan. 30, 1934 |
| 2,154,314 | Minneci | Apr. 11, 1939 |
| 2,242,812 | Brown | May 20, 1941 |
| 2,539,468 | Pikl | Jan. 30, 1951 |

FOREIGN PATENTS

| 695,340 | Germany | Aug. 22, 1940 |
| 531,907 | Great Britain | Jan. 14, 1941 |
| 888,901 | France | Sept. 20, 1943 |